United States Patent
Katsoulakos et al.

(10) Patent No.: US 10,977,603 B2
(45) Date of Patent: Apr. 13, 2021

(54) CONTENT BASED MESSAGE ROUTING FOR SUPPLY CHAIN INFORMATION SHARING

(71) Applicant: CLMS UK LIMITED, New Barnet (GB)

(72) Inventors: Panayotis Katsoulakos, W Sussex (GB); Ioannis Zorgios, South Croydon (GB); Patrick J. O'Sullivan, Dublin (IE); Vassileios Karakostas, Macclesfield (GB); Antonios Migiakis, Chalandri (GR)

(73) Assignee: CLMS UK LIMITED, New Barnet Herts (GB)

( * ) Notice: Subject to any disclaimer, the term of this patent is extended or adjusted under 35 U.S.C. 154(b) by 350 days.

(21) Appl. No.: 15/941,155

(22) Filed: Mar. 30, 2018

(65) Prior Publication Data

US 2019/0303858 A1    Oct. 3, 2019

(51) Int. Cl.
*G06Q 10/08* (2012.01)
*G06F 16/22* (2019.01)

(52) U.S. Cl.
CPC ..... *G06Q 10/0835* (2013.01); *G06F 16/2272* (2019.01)

(58) Field of Classification Search
CPC . G06Q 10/0835; G06Q 10/06; G06F 16/2272
(Continued)

(56) References Cited

U.S. PATENT DOCUMENTS 6,091,724 A * 7/2000 Chandra ............. H04L 12/1854
370/256
9,501,520 B2 * 11/2016 Saito ....................... G06F 16/30
(Continued)

FOREIGN PATENT DOCUMENTS

WO    WO-2018209254 A1 * 11/2018    ............. G06F 40/30

OTHER PUBLICATIONS

Wichmann, Pascal. "Science Direct: Towards automatically generating supply chain maps from natural language text". Published Sep. 6, 2018. https://www.sciencedirect.com/science/article/pii/S2405896318313284 (Year: 2018).*

Yan, et al., "An Ontology Based Architecture for Implementing Semantic Integration of Supply . . . ," Int. Journal of Computer Integrated Manfg, vol. 21, pp. 1-18, Jan. 2008.

(Continued)

*Primary Examiner* — George Chen
*Assistant Examiner* — Lisa Ma
(74) *Attorney, Agent, or Firm* — Steven M. Greenberg, Esq.; Shutts & Bowen LLP

(57) ABSTRACT

A supply chain message routing method includes registering in a supply chain information sharing data processing system, a multiplicity of different actors in a supply chain and generating a knowledge graph that includes different entities representative of corresponding ones of the actors joined by edges representative of relationships between respectively joined ones of the entities. The knowledge graph additionally indicates a role for each of the actors. The method also includes monitoring an event log of events published thereto by the different actors and responds to a new event posted to the event log by extracting from the event, keywords pertaining to the supply chain, mapping the keywords to one or more roles of the supply chain, identifying a set of entities in the knowledge graph corresponding to the roles, formulating a message from the new event, and publishing the formulated message to each entity in the identified set.

3 Claims, 2 Drawing Sheets

(58) Field of Classification Search
USPC .......................................................... 705/336
See application file for complete search history.

(56) References Cited

U.S. PATENT DOCUMENTS

| | | | | |
|---|---|---|---|---|
| 2012/0185486 A1* | 7/2012 | Voigt | ...................... | H04L 51/32 |
| | | | | 707/741 |
| 2013/0124755 A1* | 5/2013 | Haywood | ........... | G06F 16/9566 |
| | | | | 709/238 |
| 2018/0082183 A1* | 3/2018 | Hertz | .................. | G06F 16/9024 |

Gonzalez-Rodriguez, et al., "A Common Language for Logistics Services Interoperability," ICALT, IEEE, pp. 70-75, May 20, 2015.
Pardal, et al., "Performance Assessment of XACML Authorization for Supply Chain Traceability . . . ," CASON, IEEE, Nov. 21, 2012.

\* cited by examiner

CONTENT BASED MESSAGE ROUTING FOR SUPPLY CHAIN INFORMATION SHARING

BACKGROUND OF THE INVENTION

Field of the Invention

The present invention relates to the field of logistics data sharing and visibility and more particularly to message routing of supply chain data in supply chain management.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Because the traditional supply chain involves many different actors utilizing many different disparate information systems, information sharing amongst the different actors can be challenging. Transparency into the state of affairs of a given transaction depends largely upon the willingness and diligence of each actor in the supply chain of the transaction to provide accurate and timely information to one another. In a single transaction, so much seems not so daunting, but in a supply chain ecosystem of hundreds if not thousands of transactions are ongoing at any given time and much of the resources available within the ecosystem—particularly in respect to transportation and logistics—remain dependent upon the state of multiple different transactions.

In this regard, in any supply chain ecosystem, it is the unstated goal to optimize the utilization of all resources in the supply chain so as to most effectively and optimally bring products from source to sink. But, given the multiplicity of different actors in the supply chain and the disparity of information provided by each actor, optimization of the supply chain remains nearly impossible. To compound matters, supply chain participants vary in their willingness to share supply chain information deemed sensitive, confidential and therefore, not appropriate for public consumption.

BRIEF SUMMARY OF THE INVENTION

Embodiments of the present invention address deficiencies of the art in respect to supply chain information sharing and provide a novel and non-obvious method, system and computer program product for message routing. In an embodiment of the invention, a supply chain message routing method includes registering in a supply chain information sharing data processing system, a multiplicity of different actors in a supply chain and generating a knowledge graph in memory of the system that includes different entities representative of corresponding ones of the actors of the supply chain joined by edges representative of relationships between respectively joined ones of the entities. The knowledge graph additionally indicates a role for each of the actors. The method also includes monitoring an event log of events published thereto by the different actors of the knowledge graph and responds to a new event posted to the event log by extracting from the event, one or more keywords pertaining to the supply chain, mapping the keywords to one or more roles of the supply chain, identifying a set of entities in the knowledge graph corresponding to the one or more roles, formulating a message from the new event, and publishing the formulated message to each entity in the identified set.

In one aspect of the embodiment, the keywords are mapped to a defined set of terms which in turn are mapped to one or more of the roles. In another aspect of the embodiment, the method includes the further restriction of the publication of the message to only those of the entities authorized to receive the message according to a separate access control list defined in the supply chain information sharing data processing system. In yet another aspect of the embodiment, the keywords are extracted from the event by parsing the event into tokens and comparing each token to an index of tokens correlating multiple ones of the tokens to different corresponding keywords pertaining to the supply chain and synonymous to the correlated tokens.

In another embodiment of the invention, a supply chain data processing system configured for message routing. The system includes a host computing system of one or more computers each with memory and at least one processor, a supply chain information sharing application executing in the host computing system and registering a multiplicity of different actors in a supply chain and generating a knowledge graph in memory comprising different entities representative of corresponding ones of the actors of the supply chain joined by edges representative of relationships between respectively joined ones of the entities, the knowledge graph additionally indicating a role for each of the actors, and a message router coupled to the supply chain information sharing application.

The router includes program instructions that during execution in the memory of the host computing system, perform the monitoring of an event log of events published thereto by the different actors of the knowledge graph. The program instructions during execution in the memory of the host computing system additionally respond to a new event posted to the event log by extracting from the event, one or more keywords pertaining to the supply chain, mapping the keywords to one or more roles of the supply chain, identifying a set of entities in the knowledge graph corresponding to the one or more roles, formulating a message from the new event, and publishing the formulated message to each entity in the identified set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for content based message routing in a supply chain information sharing system. In accordance with an embodiment of the invention, different actors in a supply chain such as manufacturers, freight forwarding agents, transporters, ports of entry and distributors, each register with the supply chain information sharing data processing system in order to access dynamically changing data produced in connection with different transactions in the supply chain involving different ones of the actors. The actors are then organized into a knowledge graph of different entities representative of different resources in the supply chain, including the different actors. Ones of the actors, from time to time, post events to an event log of the system utilizing keywords pertaining to the supply chain. An event is then detected in the event log and one or more of the keywords are extracted from the event. The keywords are then mapped to one or more roles for the actors of the supply chain and the knowledge graph is interrogated with the roles to identify corresponding entities. Finally, a message is constructed for the event and the message is transmitted to those of the entities identified for the roles. In this way, messages in the information sharing data processing system are routed according to the content of the message itself without the need for the recipients of the message to subscribe to specifically subscribe to messages with particular content.

Figure 1:
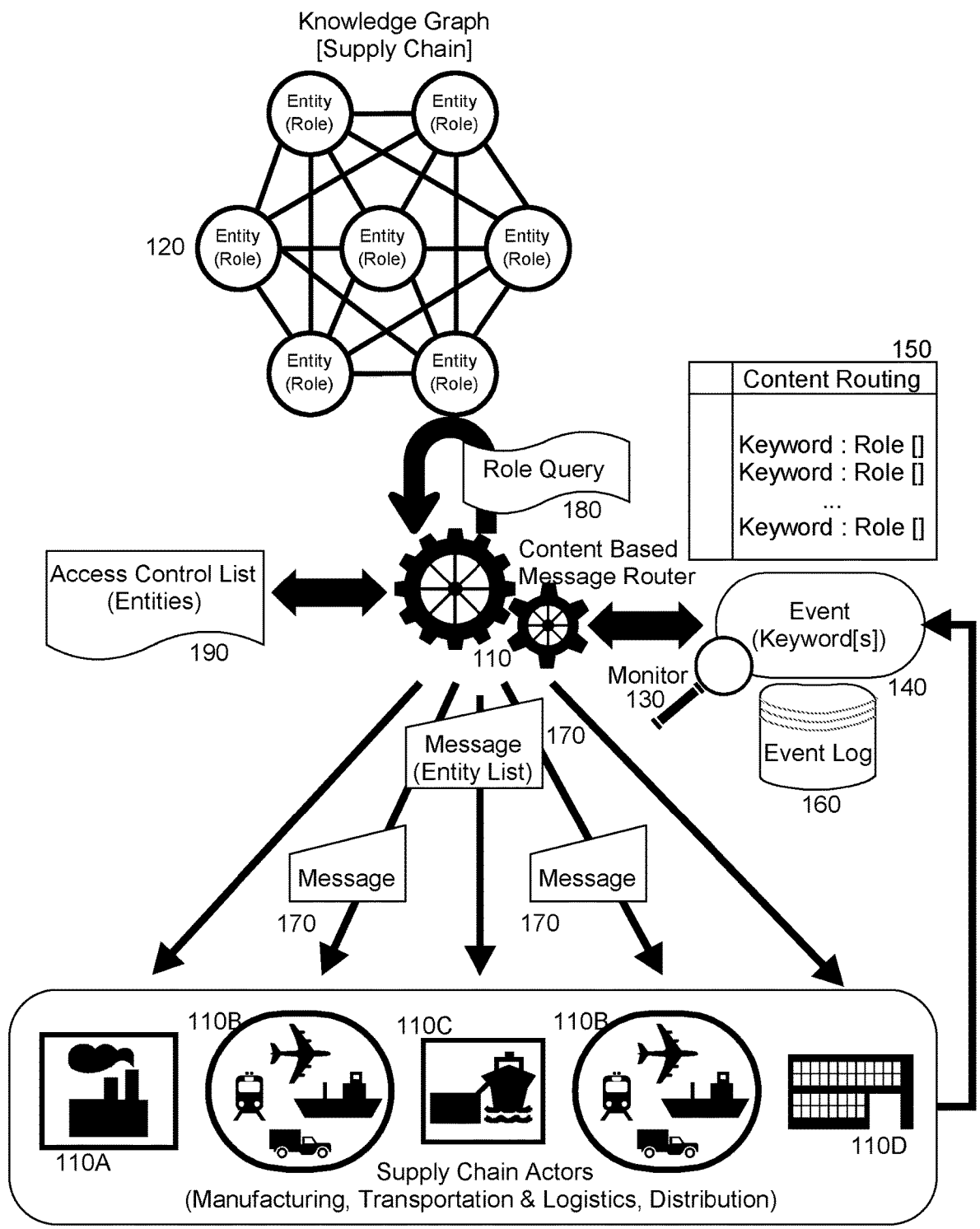
FIG. 1 is a pictorial illustration of a process for message routing in a supply chain information sharing system.

In further illustration, FIG. 1 pictorially shows a process for content based message routing in a supply chain information sharing system. As shown in FIG. 1, a knowledge graph 120 is present in memory of a supply chain information sharing system and reflects a complete supply chain. The knowledge graph includes different entities representative of different resources in a supply chain, including different actors such as manufacturers 110A, transporters 110B, ports of entry 110C and distribution points 110D. The knowledge graph 120 also includes different edges each joining selected pairs of the entities and defining the relationship between the joined entities. Finally, each of the entities of the knowledge graph 120 stores therein a role of each of the entities.

An event log 160 also is provided into which different ones of the actors 110A, 110B, 110C, 110D post events 140 pertaining to state changes in the supply chain. Each event 140 includes one or more supply chain pertinent keywords previously specified in a content routing table 150. In particular, the content routing table 150 maps the different keywords of each event 140 to one or more roles of the actors 110A, 110B, 110C, 110D. Consequently, as a monitor 130 monitors the event log 160 in order to detect an event 140 reflecting a state change in the supply chain, content based message router 110 extracts from the event 140 one or more of the keywords and maps the extracted keywords to one or more roles in the content routing table 150.

The content based message router 110 then issues a query 180 against the knowledge graph 120 with the roles in order to identify one or more entities. Finally, subject to the restrictions of an access control list 190 for the entities, the content based message router 110 transmits a message 170 constructed from the event 140 to those entities mapped to the roles and permitted by the access control list 190. Consequently, the content based message router 110 routes the message 170 only to those of the actors 110A, 110B, 110C, 110D determined to be authorized to receive the message 170 owing to the content of the event 140 as specified by the content routing table 150 and as permitted by the access control list 190.

Figure 2:
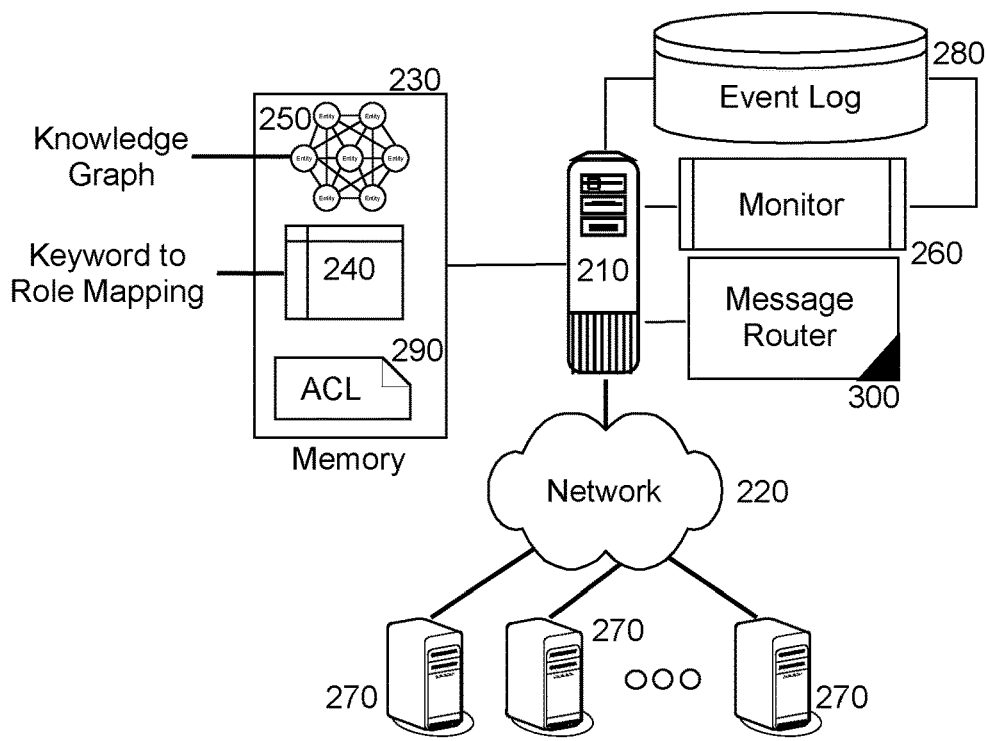
FIG. 2 is a schematic illustration of a supply chain information sharing data processing system adapted for message routing; and, FIG. 3 is a flow chart illustrating a process for message routing in a supply chain information sharing system.

The process described in connection with FIG. 1 may be implemented in a supply chain information sharing system. In further illustration, FIG. 2 schematically shows a supply chain information sharing data processing system adapted for content based message routing. The system includes a host computing system 210 that includes one or more computers each with memory 230 and at least one processor (not shown). The host computing system 210 is coupled to different enterprise computing systems 270 over computer communications network 220. Each of the different enterprise computing systems 270 corresponds to a different actor in a supply chain serviced by the host computer system, such as a manufacturer, transporter, port of entry or distribution point.

Of note, a knowledge graph 250 is disposed in the memory 230 of the host computing system 210. The knowledge graph 250 includes a multiplicity of entities each corresponding to one of the actors or other resources present in a common supply chain. The knowledge graph 250 also includes different edges coupling different pairs of the entity defining a relationship in the supply chain there between. Finally, the knowledge graph 250 includes an indication of role for each of the entities. Also present in the memory 230 is a keyword to role mapping 240. The keyword to role mapping 240 defines a mapping between different keywords pertinent to the supply chain and different roles of the actors of the supply chain indicating which types of actors (as opposed to which specific actors) are likely to be interested in messages pertaining to events occurring in the supply chain. Yet further present in the memory 230 is an access control list 290 indicating which ones of the entities of the knowledge graph 250 are permitted to view which types of messages according to the content of a message.

In operation, a monitor 260 executing in memory of the host computing system 210 monitors events in an event log 280 as the events are posted by the actors of the supply chain through the different enterprise computing systems 270. In this regard, as each event is posted to the event log 280, the monitor 260 generates a message from the event and provides the message to message router 300. For instance, the message router 300 may be a message broker managing messages pushed upon a stack managed by the message router 300. Alternatively, the message router 300 may be a publish-and-subscribe service in which messages placed on a message bus are published to those who have subscribed to the messages on the message bus. In either case, the message router 300 is broadly understood to be a computer program that includes program instructions which when executing in the host computing system 210, are enabled to inspect the content of the message provided by the monitor 260, extract the keywords of the content and consult the keyword to role mapping 240 in the memory 230 in order to identify one or more corresponding roles.

The message router 300 then interrogates the knowledge graph 250 with the identified one or more roles in order to identify specific entities of the supply chain that correspond to the one or more roles, the specific entities which are to receive routing of the message. Finally, the message router 300 limits the specific entities to only those permitted by the access control list 290 to receive the message. Then, the program code of the message router 300 transmits the generated message only to those of the enterprise computing systems 270 corresponding to actors corresponding to the limited selection of entities.

Figure 3:
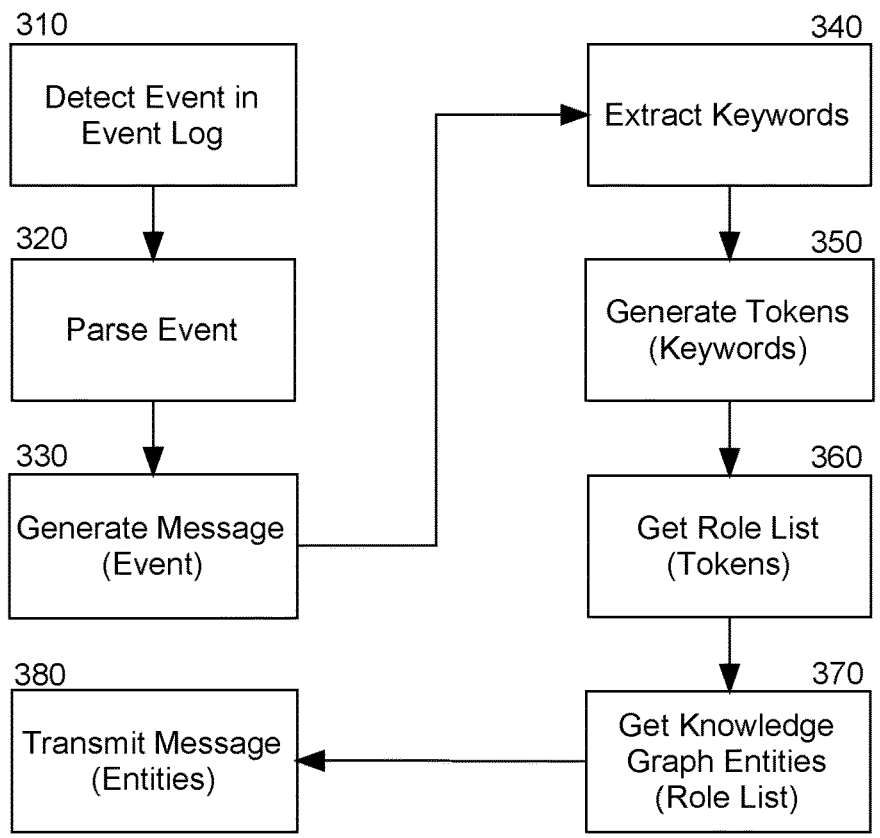

In even yet further illustration of the operation of the program instructions of the message router 300, FIG. 3 is a flow chart illustrating a process for content based message routing in a supply chain information sharing system. Beginning in block 310, an event is detected in an event log of the supply chain information sharing system. In block 320, the content of the event is extracted and in block 330 a message is generated for the event. In block 340, different keywords are extracted from the message and one or more tokens are generated from the keywords. In this regard, an index of tokens mapping each token to one or more of synonymous keywords reflective of supply chain terminology is consulted with the keywords extracted from the message in order to produce a set of uniform tokens with which, in block 360 a mapping is consulted to identify one or more corresponding roles. Thereafter, in block 370 the knowledge graph is interrogated with the roles to identify specific entities intended to receive the message. Finally, in block 380 the message is provided to each identified specific entities.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A supply chain message routing method comprising:
registering in a supply chain information sharing data processing system, a multiplicity of different actors in a supply chain;
generating a knowledge graph in memory of the system comprising different entities representative of corresponding ones of the actors of the supply chain joined by edges representative of relationships between respectively joined ones of the entities, the knowledge graph additionally indicating a role for each of the actors;
storing in the memory, both an access control list defining which ones of the different entities of the generated knowledge graph are permitted to view which types of messages according to particular content of the messages, and also an index of tokens mapping each of the tokens to one or more of synonymous keywords reflective of supply chain terminology;
monitoring an event log of events published thereto by the different actors of the knowledge graph; and,
responding to a new event posted to the event log by:
(1) extracting content from the event, the content comprising one or more keywords pertaining to the supply chain,
(2) generating uniform tokens from the keywords by locating in the index in the memory, the uniform tokens mapped to the extracted keywords, and then mapping the uniform tokens to one or more roles of the supply chain,
(3) interrogating the knowledge graph with the one or more roles, the knowledge graph responding by identifying a set of entities in the knowledge graph corresponding to the one or more roles,
(4) formulating a message from the new event,
filtering the set of the entities according to the access control list based upon a type of the message, and
(5) publishing the formulated message to each entity in the identified set as filtered so that the message is routed to the entities permitted to view the message according to the message type, not based upon a subscription to the event, but by the content of the event.

2. A supply chain data processing system configured for message routing, the system comprising:
a host computing system comprising one or more computers each with memory and at least one processor;
a supply chain information sharing application executing in the host computing system and registering a multiplicity of different actors in a supply chain, generating a knowledge graph in memory comprising different entities representative of corresponding ones of the actors of the supply chain joined by edges representative of relationships between respectively joined ones of the entities, the knowledge graph additionally indicating a role for each of the actors, and storing in the memory, both an access control list defining which ones of the different entities of the generated knowledge graph are permitted to view which types of messages according to particular content of the messages, and also an index of tokens mapping each of the tokens to one or more of synonymous keywords reflective of supply chain terminology; and,
a message router coupled to the supply chain information sharing application, the router comprising program instructions that during execution in the memory of the host computing system, perform:
monitoring an event log of events published thereto by the different actors of the knowledge graph; and,
responding to a new event posted to the event log by:
(1) extracting content from the event, the content comprising one or more keywords pertaining to the supply chain,
(2) generating uniform tokens from the keywords by locating in the index in the memory, the uniform tokens mapped to the extracted keywords, and then mapping the uniform tokens to one or more roles of the supply chain,
(3) interrogating the knowledge graph with the one or more roles, the knowledge graph responding by identifying a set of entities in the knowledge graph corresponding to the one or more roles,
(4) formulating a message from the new event,
(5) filtering the set of the entities according to the access control list based upon a type of the message, and
(6) publishing the formulated message to each entity in the identified set as filtered so that the message is routed to the entities permitted to view the message according to the message type, not based upon a subscription to the event, but by the content of the event.

3. A computer program product for supply chain message routing, the computer program product including a computer readable storage medium having program instructions embodied therewith, the program instructions executable by a device to cause the device to perform a method including:
registering in a supply chain information sharing data processing system, a multiplicity of different actors in a supply chain;
generating a knowledge graph in memory of the system comprising different entities representative of corresponding ones of the actors of the supply chain joined by edges representative of relationships between respectively joined ones of the entities, the knowledge graph additionally indicating a role for each of the actors;
storing in the memory, both an access control list defining which ones of the different entities of the generated knowledge graph are permitted to view which types of messages according to particular content of the messages, and also an index of tokens mapping each of the tokens to one or more of synonymous keywords reflective of supply chain terminology;
monitoring an event log of events published thereto by the different actors of the knowledge graph; and,
responding to a new event posted to the event log by:
(1) extracting content from the event, the content comprising one or more keywords pertaining to the supply chain,
(2) generating uniform tokens from the keywords by locating in the index in the memory, the uniform tokens mapped to the extracted keywords, and then mapping the uniform tokens to one or more roles of the supply chain,
(3) interrogating the knowledge graph with the one or more roles, the knowledge graph responding by identifying a set of entities in the knowledge graph corresponding to the one or more roles,
(4) formulating a message from the new event,
(5) filtering the set of the entities according to the access control list based upon a type of the message, and
(6) publishing the formulated message to each entity in the identified set as filtered so that the message is routed to the entities permitted to view the message according to the message type, not based upon a subscription to the event, but by the content of the event.

\* \* \* \* \*